US012483450B2

United States Patent
Zhang et al.

(10) Patent No.: US 12,483,450 B2
(45) Date of Patent: Nov. 25, 2025

(54) SHORT-RANGE WIRELESS COMMUNICATION METHOD AND RELATED DEVICE

(71) Applicant: HUAWEI TECHNOLOGIES CO., LTD., Guangdong (CN)

(72) Inventors: Heng Zhang, Singapore (SG); Kai Fu, Singapore (SG); Zhiping Li, Singapore (SG); Zhan Yu, Singapore (SG)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 122 days.

(21) Appl. No.: 18/512,668

(22) Filed: Nov. 17, 2023

(65) Prior Publication Data

US 2024/0089156 A1    Mar. 14, 2024

Related U.S. Application Data

(63) Continuation of application No. PCT/CN2021/095323, filed on May 21, 2021.

(51) Int. Cl.
*H04L 27/00* (2006.01)
*H04L 27/20* (2006.01)
*H04L 27/36* (2006.01)
*H04L 27/38* (2006.01)

(52) U.S. Cl.
CPC .......... *H04L 27/0008* (2013.01); *H04L 27/20* (2013.01); *H04L 27/366* (2013.01); *H04L 27/38* (2013.01)

(58) Field of Classification Search
CPC ... H04L 27/0008; H04L 27/20; H04L 27/366; H04L 27/38; H04L 5/0044; H04L 27/18; H04W 4/80; Y02D 30/70
See application file for complete search history.

(56) References Cited

U.S. PATENT DOCUMENTS

| | | | |
|---|---|---|---|
| 5,587,939 A * | 12/1996 | Soleymani | H04J 1/05 |
| | | | 708/319 |
| 6,700,929 B1 * | 3/2004 | Shan | H04B 1/7115 |
| | | | 375/349 |
| 2018/0123749 A1 | 5/2018 | Azizi et al. | |

FOREIGN PATENT DOCUMENTS

CN    111065083 A    4/2020

* cited by examiner

*Primary Examiner* — Vineeta S Panwalkar
(74) *Attorney, Agent, or Firm* — WOMBLE BOND DICKINSON (US) LLP

(57) ABSTRACT

This application provides a short-range wireless communication method and a related device. The method includes: generating a transmission frame. The transmission frame includes a frame header and a data domain, phase shift keying modulation is used for the frame header, and quadrature amplitude modulation or phase shift keying modulation is used for the data domain. The method includes sending the transmission frame. In this application, the phase shift keying modulation is used for the frame header of the transmission frame, and the phase shift keying modulation or the quadrature amplitude modulation with a same bandwidth is used for the data domain.

18 Claims, 5 Drawing Sheets

| Preamble | Synchronization access sequence | Packet header | Data domain |
|---|---|---|---|

| Preamble | Synchronization access sequence | Packet header | Data domain |
|---|---|---|---|
FIG. 6
| Preamble | Access code | Packet header | Data domain |
|---|---|---|---|
FIG. 7
(a)
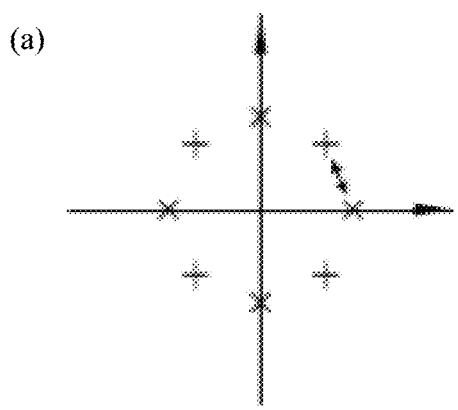
(b)
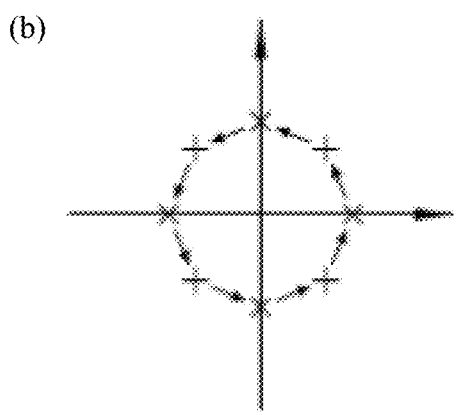
FIG. 8

SHORT-RANGE WIRELESS COMMUNICATION METHOD AND RELATED DEVICE

CROSS-REFERENCE TO RELATED APPLICATION

This application is a continuation of International Application No. PCT/CN2021/095323, filed on May 21, 2021, the disclosure of which is hereby incorporated by reference in its entirety.

TECHNICAL FIELD

This application relates to the field of short-range wireless communication technologies, and in particular, to a short-range wireless communication method and a related device.

BACKGROUND

Short-range wireless communication technologies are technologies for wireless data exchange in a small area (from tens of meters to hundreds of meters). The short-range wireless communication technologies include a Bluetooth (BT) technology, a wireless fidelity (Wi-Fi) technology, an ultra-wideband (UWB) technology, and a near field communication (NFC) technology.

However, a transmission rate of an existing Bluetooth technology is not high (a maximum of 3 Mbps), resulting in a corresponding low throughput and a large latency. An existing Bluetooth standard cannot meet some application scenarios with a high throughput and a low latency. For example, in an application scenario with a high throughput, when firmware upgrade is performed on devices configured with Bluetooth, such as a smartwatch and a smart band, a downloaded firmware installation package needs to be transmitted to these devices over Bluetooth for installation. A data transmission volume is large, and current Bluetooth transmission is time-consuming, affecting user experience. For example, in an application scenario with a low latency, when a wireless keyboard and a wireless mouse are used, text information entered by the keyboard and coordinate information of the mouse need to be transmitted to a computer in a slot that can be perceived by a human eye. When the wireless keyboard and the wireless mouse are used to play games, there is a large latency in the current Bluetooth transmission, affecting user experience. For example, in an application scenario with a high throughput and a low latency, when wireless earphones are used to watch a high definition video, high definition audio data needs to be transmitted to the earphones and played, to keep audio-to-video synchronization. A current Bluetooth device can only transmit low-quality audio information and complete audio playing, affecting user experience in listening to a high definition audio.

SUMMARY

In view of the foregoing content, a short-range wireless communication method, a system, a sending apparatus, a receiving apparatus, a short-range wireless communication system, and a storage medium need to be provided, to help improve a throughput and reduce a latency, to improve user experience.

According to a first aspect, an embodiment of this application provides a short-range wireless communication method. The method includes: generating a transmission frame, where the transmission frame includes a frame header and a data domain, and phase shift keying modulation is used for the frame header, and phase shift keying modulation or quadrature amplitude modulation with a same bandwidth as the frame header is used for the data domain.

In this way, the phase shift keying modulation is used for the frame header of the transmission frame, and the phase shift keying modulation or the quadrature amplitude modulation with the same bandwidth is used for the data domain, to improve a transmission rate of the transmission frame. A format of the transmission frame is simple, and transmission time is short, to achieve a high throughput and a low latency.

In some embodiments of the first aspect, the frame header includes a preamble, first phase shift keying modulation is used for the preamble, and any adjacent symbols of a sequence of the preamble are adjacent points on a constellation diagram corresponding to the first phase shift keying modulation.

In this way, the adjacent symbols of the sequence of the preamble are limited to being the adjacent points on the constellation diagram corresponding to a modulation scheme of the preamble, so that an amplitude fluctuation of the preamble is small, to approximate a constant envelope signal, and impact of an amplitude fluctuation caused by modulation on gain adjustment is reduced. The first phase shift modulation may be any type of phase shift modulation supported by the preamble.

In some embodiments of the first aspect, the frame header further includes an access code.

In this way, a format of the frame header of the transmission frame is simple, a length of the frame header is short, and transmission time is minimized, to achieve a high throughput and a low latency.

In some embodiments of the first aspect, the frame header further includes a synchronization code and an access code.

In this way, synchronization performance of the transmission frame is improved by using the synchronization code, and time synchronization, frequency estimation, and phase estimation may be implemented by using the synchronization code, to improve overall performance of a receiving apparatus, ensure that information can be correctly received even when channel quality is poor, and improve receiving performance at a high rate.

In some embodiments of the first aspect, the frame header further includes a first synchronization code, a second synchronization code, and an access code.

In this way, two segments of synchronization codes are set to improve receiving performance and increase a quantity of combinations of synchronization codes. Combinations of different synchronization codes may be used as network IDs to distinguish devices in different networks. Devices in a same network are distinguished by using the access code. The two segments of synchronization codes improve overall performance of a receiving apparatus, and ensure that information can be correctly received even when channel quality is poor.

In some embodiments of the first aspect, the method further includes: adjusting a modulation scheme of the transmission frame based on channel quality.

In this way, the modulation scheme of the transmission frame is adjusted based on the channel quality, so that transmission from the transmission frame is applicable to different application environments.

In some embodiments of the first aspect, the method further includes adjusting a bandwidth of the transmission frame based on the channel quality, where bandwidths supported by the transmission frame include: 1 MHz, 2 MHz, and 4 MHz.

In some embodiments of the first aspect, the phase shift keying modulation has a feature of parity rotation.

In this way, based on this feature, a peak-to-average power ratio of the sending apparatus is reduced, and transmit power is increased, to cover a larger receiving range.

In some embodiments of the first aspect, the frame header further includes a packet header, and the method further includes adjusting a coding scheme of a to-be-encoded field in the transmission frame based on a channel instruction, where the to-be-encoded field includes at least one of the access code, the packet header, and the data domain, the coding scheme includes a coding type and a bit rate, and the coding type is forward error correction coding.

In this way, an anti-noise capability of the transmission frame is improved by channel coding.

In some embodiments of the first aspect, the frame header further includes a packet header, and the method further includes: adjusting an insertion mode of a pilot field based on the channel quality, where the insertion mode includes a to-be-inserted field and an insertion proportion, the to-be-inserted field includes at least one of the access code, the packet header, and the data domain, and the pilot field is used to assist in phase estimation.

In this way, the insertion mode of the pilot field is adjusted based on the channel quality, so that this application is applicable to different application environments.

According to a second aspect, a short-range wireless communication method is provided. The method includes:
receiving a transmission frame, where the transmission frame includes a frame header and a data domain, phase shift keying modulation is used for the frame header, and phase shift keying modulation or quadrature amplitude modulation with a same bandwidth as the frame header is used for the data domain.

In some embodiments of the second aspect, the frame header includes a preamble, first phase shift keying modulation is used for the preamble, and any adjacent symbols of a sequence of the preamble are adjacent points on a constellation diagram corresponding to the first phase shift keying modulation.

In some embodiments of the second aspect, the frame header further includes an access code.

In some embodiments of the second aspect, the frame header further includes a synchronization code and an access code.

In some embodiments of the second aspect, the frame header further includes a first synchronization code, a second synchronization code, and an access code.

In some embodiments of the second aspect, bandwidths supported by the transmission frame include: 1 MHz, 2 MHz, and 4 MHz.

In some embodiments of the second aspect, any adjacent symbols of the sequence of the preamble are adjacent constellation points on the constellation diagram.

In some embodiments of the second aspect, the phase shift keying modulation has a feature of parity rotation.

In some embodiments of the second aspect, the frame header further includes a packet header, and forward error correction coding may be used for at least one field of the access code, the packet header, and the data domain.

In some embodiments of the second aspect, the frame header further includes a packet header, at least one field of the access code, the packet header, and the data domain has a pilot field, and the pilot field is used to assist in phase estimation.

According to a third aspect, a sending apparatus is provided. The sending apparatus includes:
a processor, configured to generate a transmission frame;
a transmitting circuit, coupled to the processor, and configured to send the transmission frame; and
at least one processor, a memory, and a communication interface, where the at least one processor is coupled to the memory and the communication interface;
the memory is configured to store instructions, the processor is configured to execute the instructions, and the communication interface is configured to communicate with a receiving apparatus under control of the at least one processor; and
when the instructions are executed by the at least one processor, the at least one processor is enabled to perform any short-range wireless communication method in the first aspect.

According to a fourth aspect, a sending apparatus is provided. The sending apparatus includes:
a processor, configured to generate a transmission frame, where the transmission frame includes a frame header and a data domain, phase shift keying modulation is used for the frame header, and phase shift keying modulation or quadrature amplitude modulation with a same bandwidth as the frame header is used for the data domain; and
a transmitting circuit, coupled to the processor, and configured to send the transmission frame.

In some embodiments of the fourth aspect, the frame header includes a preamble, first phase shift keying (PSK) modulation is used for the preamble, and any adjacent symbols of a sequence of the preamble are adjacent points on a constellation diagram corresponding to the first PSK modulation.

In some embodiments of the fourth aspect, the frame header further includes an access code.

In some embodiments of the fourth aspect, the frame header further includes a synchronization code and an access code.

In some embodiments of the fourth aspect, the frame header further includes a first synchronization code, a second synchronization code, and an access code.

In some embodiments of the fourth aspect, the processor is further configured to adjust a modulation scheme of the transmission frame based on channel quality.

In some embodiments of the fourth aspect, the processor is further configured to adjust a bandwidth of the transmission frame based on the channel quality, where bandwidths supported by the transmission frame include: 1 MHz, 2 MHz, and 4 MHz.

In some embodiments of the fourth aspect, the phase shift keying modulation has a feature of parity rotation.

In some embodiments of the fourth aspect, the frame header further includes a packet header, and the processor is further configured to:
adjust a coding scheme of a to-be-encoded field in the transmission frame based on channel quality, where the to-be-encoded field includes at least one of the access code, the packet header, and the data domain, the coding scheme includes a coding type and a bit rate, and the coding type is forward error correction coding.

In some embodiments of the fourth aspect, the frame header further includes a packet header, and the processor is further configured to:

adjust an insertion mode of a pilot field based on the channel quality, where the insertion mode includes a to-be-inserted field and an insertion proportion, the to-be-inserted field includes at least one of the access code, the packet header, and the data domain, and the pilot field is used to assist in phase estimation.

According to a fifth aspect, a receiving apparatus is provided. The receiving apparatus includes at least one processor, a memory, and a communication interface, where the at least one processor is coupled to the memory and the communication interface;

the memory is configured to store instructions, the processor is configured to execute the instructions, and the communication interface is configured to communicate with a sending apparatus under control of the at least one processor; and when the instructions are executed by the at least one processor, the at least one processor is enabled to perform any short-range wireless communication method in the second aspect.

According to a sixth aspect, a receiving apparatus is provided. The receiving apparatus includes:

a receiving circuit, configured to receive a transmission frame, where the transmission frame includes a frame header and a data domain, phase shift keying modulation is used for the frame header, and phase shift keying modulation or quadrature amplitude modulation with a same bandwidth as the frame header is used for the data domain; and a processor, where the receiving circuit is coupled to the processor.

The frame header includes a preamble, first phase shift keying modulation is used for the preamble, and any adjacent symbols of a sequence of the preamble are adjacent points on a constellation diagram corresponding to the first phase shift keying.

In some embodiments of the sixth aspect, the frame header further includes an access code.

In some embodiments of the sixth aspect, the frame header further includes a synchronization code and an access code.

In some embodiments of the sixth aspect, the frame header further includes a first synchronization code, a second synchronization code, and an access code.

In some embodiments of the sixth aspect, bandwidths supported by the transmission frame include: 1 MHz, 2 MHz, and 4 MHz.

In some embodiments of the sixth aspect, the phase shift keying modulation has a feature of parity rotation.

In some embodiments of the sixth aspect, the frame header further includes a packet header, and forward error correction coding is used for at least one of the access code, the packet header, and the data domain.

In some embodiments of the sixth aspect, the frame header further includes a packet header, at least one of the access code, the packet header, and the data domain has a pilot field, and the pilot field is used to assist in phase estimation.

According to a seventh aspect, a short-range wireless communication system is provided. The short-range wireless communication system includes a sending apparatus and a receiving apparatus, where the sending apparatus is configured to perform any short-range wireless communication method in the first aspect, and the receiving apparatus is configured to perform any short-range wireless communication method in the second aspect.

An eighth aspect of this application provides a computer-readable storage medium. The computer-readable storage medium stores a program, and the program enables a computer device to perform any short-range wireless communication method in the first aspect and the second aspect.

For specific descriptions of the second aspect to the eighth aspect and the implementations of the second aspect to the eighth aspect in this application, refer to the detailed descriptions in the first aspect and the implementations of the first aspect. In addition, for beneficial effects of the second aspect to the eighth aspect and the implementations of the second aspect to the eighth aspect, refer to analyses of beneficial effects in the first aspect and the implementations of the first aspect. Details are not described herein again.

BRIEF DESCRIPTION OF DRAWINGS

FIG. 6 is a schematic diagram of a transmission frame according to an embodiment of this application;

FIG. 7 is a schematic diagram of a transmission frame according to Embodiment 1 of this application;

FIG. 8 is schematic constellation diagrams of two types of preambles according to an embodiment of this application;

DESCRIPTION OF EMBODIMENTS

In the descriptions of embodiments of this application, the word such as "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner.

Unless otherwise defined, all technical and scientific terms used herein have same meanings generally understood by a person skilled in the art in this application. Terms used in the specification of this application are merely intended to describe example embodiments, but are not intended to limit this application. It should be understood that in this application, unless otherwise specified, "a plurality of" means two or more.

Figure 1:
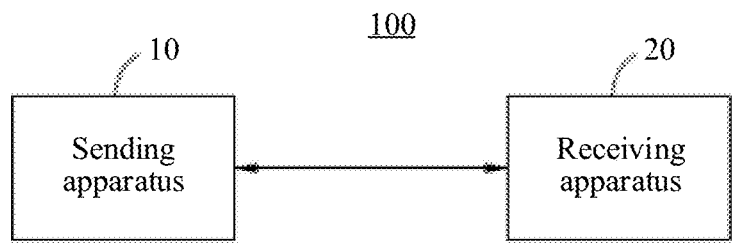
FIG. 1 is a schematic diagram of a short-range wireless communication system according to an embodiment of this application.

FIG. 1 is a schematic diagram of a short-range wireless communication system according to an embodiment of this application. As shown in FIG. 1, the short-range wireless communication system 100 includes a sending apparatus 10 and a receiving apparatus 20.

The sending apparatus 10 is configured to generate a transmission frame, and send the transmission frame to the receiving apparatus 20. The receiving apparatus 20 is configured to receive the transmission frame.

In this embodiment, one sending apparatus 10 communicates with one receiving apparatus 20. It may be understood that the short-range wireless communication system 100 may include a plurality of sending apparatuses 10, and may also include a plurality of receiving apparatuses 20. Each sending apparatus 10 may communicate with a plurality of receiving apparatuses 20. Each receiving apparatus 20 may communicate with a plurality of sending apparatuses 10. For example, one sending apparatus performs data transmission with different receiving apparatuses at different moments.

Figure 2:
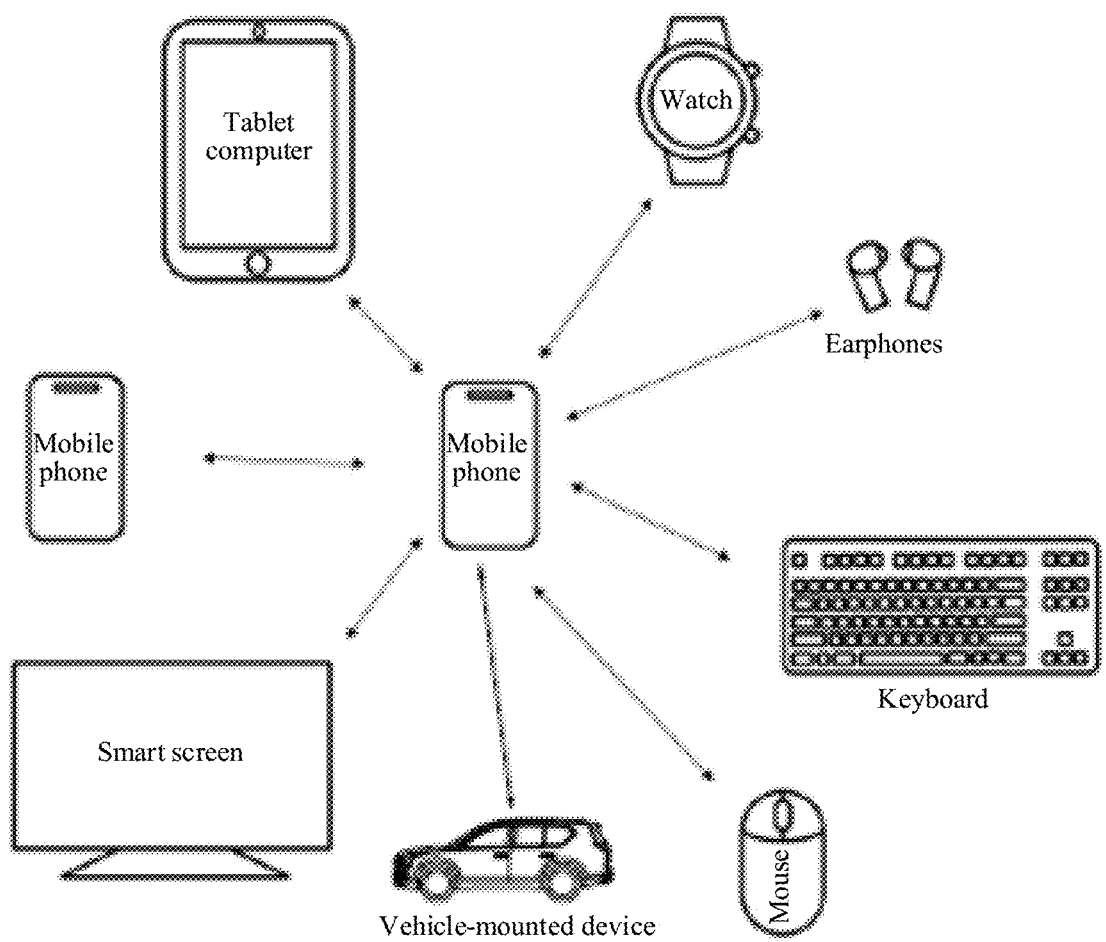
FIG. 2 is a schematic diagram of an application scenario of a short-range wireless communication system according to an embodiment of this application.

FIG. 2 is a schematic diagram of an application scenario of a short-range wireless communication system according to an embodiment of this application. The short-range wireless communication system may be used in a terminal device, for example, a mobile phone or a tablet computer, or may be used in a wearable device, for example, a smartwatch or wireless earphones, or may be used in a peripheral device, for example, a keyboard or a mouse, or may be used in an Internet of things (IoT) device, for example, a smart home, or may be used in a vehicle-mounted system, as shown in FIG. 2. For example, based on the short-range wireless communication system, wireless earphones may be used to make a call or listen to high-quality music, a smart band or a smartwatch may be used to quickly upload sports and health data to a mobile phone, a wireless keyboard and a wireless mouse may be used to play games without a latency, and a mobile phone may be used to quickly upgrade firmware for these peripheral devices. It may be understood that FIG. 2 merely shows the application scenario provided in this application, and the short-range wireless communication system provided in this application may be further applied to another application scenario.

Figure 3:
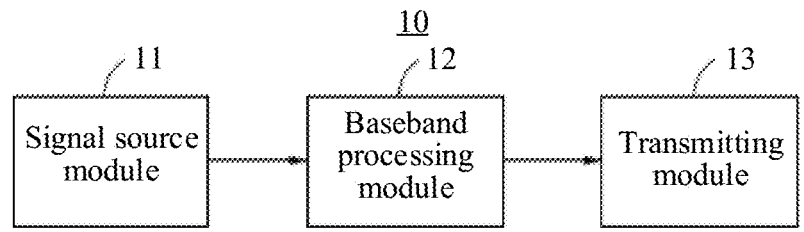
FIG. 3 is a schematic diagram of a module structure of a sending apparatus according to an embodiment of this application.

FIG. 3 is a schematic diagram of a module of a sending apparatus according to an embodiment of this application.

The sending apparatus 10 includes a signal source module 11, a baseband processing module 12, and a transmitting module 13. The signal source module 11 is configured to compile to-be-sent original data into a bit data stream. Certainly, the signal source module 11 may further perform operations such as encryption, checking, whitening, and encoding. The baseband processing module 12 is configured to: encapsulate the bit data stream, then perform packet assembly based on a transmission frame format, and finally map the bit data stream into a baseband signal based on a modulation scheme. The transmitting module 13 is configured to modulate the baseband signal to a frequency band suitable for transmission, and then perform operations such as filtering and amplification, to transmit the baseband signal.

It may be understood that FIG. 3 merely shows the embodiment of the sending apparatus provided in this application. Alternatively, the sending apparatus may include at least one other function module.

Figure 4:
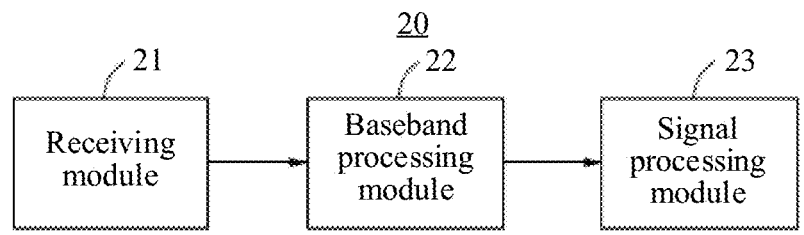
FIG. 4 is a schematic diagram of a module structure of a receiving apparatus according to an embodiment of this application.

FIG. 4 is a schematic diagram of a module of a receiving apparatus according to an embodiment of this application.

The receiving apparatus 20 includes a receiving module 21, a baseband processing module 22, and a signal processing module 23. The receiving module 21 is configured to perform operations such as amplification, mixing, filtering, and sampling on a received signal, to form a baseband signal that can be identified by the baseband processing module 22. The baseband processing module 22 is configured to perform operations such as synchronization, tracking, and demodulation on the baseband signal to obtain a bit data stream in data. The signal processing module 23 is configured to translate the bit data stream into original data that can be identified, where operations such as decoding, de-whitening, checking, and decryption may be involved.

It may be understood that FIG. 4 merely shows the embodiment of the receiving apparatus provided in this application. Alternatively, the receiving apparatus may include at least one other function module.

FIG. 5a, FIG. 5b, FIG. 5c, and FIG. 5d are schematic diagrams of transmission frames in some embodiments based on a Bluetooth protocol. The transmission frames provided in embodiments of this application are described by using the Bluetooth protocol as an example. It may be understood that embodiments of this application may be further applied to another short-range communication technology, for example, an alternative standard of the Bluetooth protocol.

Figure 5A:
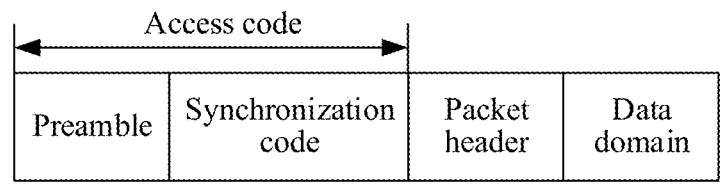
FIG. 5a is a schematic diagram of a basic rate frame according to an embodiment of this application.

The transmission frame shown in FIG. 5a is a basic rate (BR) frame, and the BR frame includes a preamble, a synchronization code, a packet header, and a data domain. The preamble is used for gain adjustment for a receiving apparatus. The receiving apparatus can receive a signal within an expected amplitude range only when a gain of the receiving apparatus is adjusted to an appropriate value. The synchronization code is used to perform frame synchronization, where the frame synchronization includes time synchronization, frequency offset estimation, and phase estimation. After the receiving apparatus correctly receives a synchronization code field and successfully performs frame synchronization, the receiving apparatus can successfully receive a subsequent field. If an error occurs when the receiver receives the synchronization code, the synchronization fails, and the receiving apparatus stops receiving a field following the transmission frame, causing the receiving apparatus to lose a frame. The packet header includes control information, and the receiving apparatus demodulates the data domain based on the packet header. The data domain is used to transmit data information. The data domain includes user data, a check code, and a packet trailer. The check code may be a cyclic redundancy check (CRC). A field before the data domain is referred to as a frame header. Gaussian frequency shift keying (GFSK) modulation is used for both the frame header and the data domain of the BR frame, and the BR frame occupies a signal bandwidth of 1 MHz and can provide a bit rate of 1 Mbps. The basic rate frame has a small signal bandwidth and a low data transmission rate.

Figure 5B:
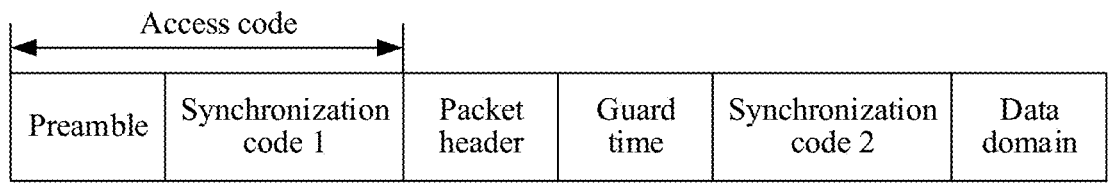
FIG. 5b is a schematic diagram of an enhanced rate frame according to an embodiment of this application.

The transmission frame shown in FIG. 5b is an enhanced rate (EDR) frame. Compared with the basic rate frame, two fields, a guard time and a synchronization code 2, are added between a packet header and a data domain of the EDR frame. Gaussian frequency shift keying modulation is used for a frame header of the EDR frame, and differential phase shift keying modulation is used for the data domain. Because it takes time to perform switching between the two modulation schemes, the guard time is added. A length of the guard time ranges from 4.75 usec to 5.25 usec. The guard time field does not include any valid information and is only used for modulation scheme switching. Because synchronization needs to be performed again after the guard time elapses, the synchronization code 2 field is added. The GFSK modulation is used for the frame header of the EDR frame, and the EDR frame occupies a signal bandwidth of 1 MHz and can provide a bit rate of 1 Mbps. Differential quadrature phase shift keying modulation or 8-phase differential shift keying modulation is used for fields following the guard time that each occupy a signal bandwidth of 1 MHz. The transmission frame in this embodiment can provide a bit rate of 2 Mbps or 3 Mbps.

Because different modulation schemes are used for the frame header and the data domain of the EDR, the guard time and the synchronization code 2 are added. As a result, an overall speed of a data packet is low and a latency is large.

Figure 5C:
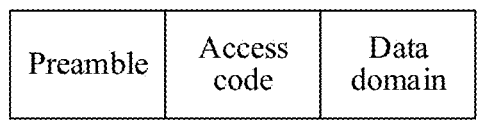
FIG. 5c is a schematic diagram of a little-endian (LE) unencoded frame according to an embodiment of this application.

The transmission frame shown in FIG. 5c is a little-endian (LE) unencoded frame, and the LE unencoded frame includes a preamble, an access code, and a data domain. The access code is used to perform frame synchronization. GFSK modulation is used for the LE unencoded frame, and two rates, LE1M and LE2M, are included. LE1M occupies a signal bandwidth of 1 MHz and can provide a bit rate of 1 Mbps. LE2M occupies a signal bandwidth of 2 MHz and can provide a bit rate of 2 Mbps. The LE unencoded frame is transmitted at a low speed to achieve low power consumption.

Figure 5D:
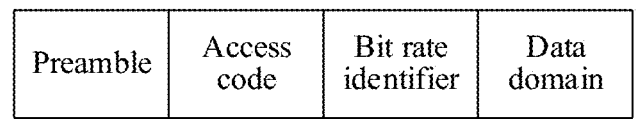
FIG. 5d is a schematic diagram of an LE encoded frame according to an embodiment of this application.

The transmission frame shown in FIG. 5d is an LE encoded frame, and the LE encoded frame includes a preamble, an access code, a bit rate identifier, and a data domain. To improve receiving performance, in the LE encoded frame, 1/2 bit rate forward error correction coding and 4 times repetition coding are used for the access code, the bit rate identifier field, and the data domain field. The 1/2 bit rate forward error correction coding is used to encode one information bit into two bits. The 4 times repetition coding is used to repeat each encoded bit four times to form four bits. Fixed 1/2 forward error correction coding and 4 times repetition coding are used for the access code and the bit rate identifier field of the LE encoded frame, that is, one information bit is encoded into eight bits. The 1/2 forward error correction coding or the 1/2 forward error correction coding and the 4 times repetition coding is/are used for the data domain field of the LE encoded frame, and a coding scheme is stored in the bit rate identifier field. GFSK modulation is used for the LE encoded frame, and the LE encoded frame occupies a bandwidth of 1 MHz. Affected by coding, the access code and another part can provide a bit rate of 125 Kbps, and the data domain and another part can provide a bit rate of 500 Kbps or 125 Kbps. Based on the fixed 1/2 forward error correction coding and 4 times repetition coding, data transmission accuracy is improved, resulting in more data transmission redundancy and a low transmission speed.

The transmission frames shown in FIG. 5a, FIG. 5b, FIG. 5c, and FIG. 5d have the following problems: A throughput is low, and a latency is large. To resolve the problems of the transmission frames shown in the foregoing embodiments, this application provides a new format of a transmission frame.

FIG. 6 is a schematic diagram of a transmission frame according to an embodiment of this application.

The transmission frame includes a preamble, a synchronization access sequence, a packet header, and a data domain. For the preamble, the synchronization access sequence, and the packet header in the transmission frame, the preamble is used for gain adjustment for a receiving apparatus. The synchronization access sequence is used to perform frame synchronization for the receiving apparatus, where the frame synchronization includes time synchronization, frequency estimation, and phase estimation. The packet header includes control information and header error control (HEC), where the HEC is used to detect whether packet header data is correct. The data domain includes user data, a check code, and a packet trailer. The check code may be a CRC, and may be used to check integrity of the user data.

In this way, the baseband processing module 12 of the sending apparatus 10 performs packet assembly based on the format of the transmission frame shown in FIG. 6. The baseband processing module 12 encapsulates, into the data domain, bit data compiled by the signal source module 11. In addition, a compilation mode of the signal source module 11 is also encapsulated into the data domain, to assist the signal processing module 23 of the receiving apparatus 20 in translating the bit data into original data in a correct manner. Next, the baseband processing module 12 of the sending apparatus 10 adds fields such as the preamble, the synchronization access sequence, and the packet header before the data domain, to assist the receiving apparatus in receiving.

The receiving module 21 of the receiving apparatus 20 performs gain adjustment based on the preamble, to ensure that a subsequent signal amplitude can be adjusted to fall within an appropriate range. The baseband processing module 22 of the receiving apparatus 20 performs operations such as synchronization, frequency offset estimation, and phase estimation based on the synchronization access sequence. After the synchronization is successful, the baseband processing module 22 continues to demodulate a subsequent field. The baseband processing module 22 of the receiving apparatus 20 obtains through demodulation the packet header, and then demodulates the data domain based on information in the packet header to obtain bit data. The signal processing module 23 translates the bit data in a signal source compilation mode in the bit data, to obtain the original data.

FIG. 7 is a schematic diagram of Embodiment 1 of a transmission frame according to this application. This embodiment of this application is described by using a Bluetooth protocol as an example. It may be understood that this embodiment of this application may be further applied to another short-range communication technology, for example, an alternative standard of the Bluetooth protocol.

FIG. 7 shows an embodiment of the transmission frame shown in FIG. 6. The transmission frame includes a preamble, an access code, a packet header, and a data domain. The access code is used as a synchronization access sequence, and the access code is used as a user ID to implement frame synchronization. A format of the transmission frame is simple, a length of the frame header is short, and transmission time is minimized, to achieve a high throughput and a low latency. It may be understood that, during actual application, a composition of a frame header is adjusted. For example, the frame header may include only the preamble, or the frame header includes the preamble and the access code, or the frame header includes the preamble, the access code, and the packet header.

In an embodiment of this application, phase shift keying (PSK) modulation with a same bandwidth is used for the frame header of the transmission frame, that is, the preamble, the access code, and the packet header.

For example, binary phase shift keying (BPSK) modulation with a bandwidth of 4 MHz is used for the frame header of the transmission frame, and a bit rate of the frame header may reach 4 Mbps. Quadrature phase shift keying (QPSK) modulation with a bandwidth of 4 MHz is used for the frame header of the transmission frame, and a bit rate of the frame header may reach 8 Mbps. With an increase in the transmission rate of the frame header, transmission time of the frame header can be shortened and a latency can be reduced.

Preferably, either $\pi/2$-BPSK modulation or $\pi/4$-QPSK modulation may be used for the frame header.

Further, phase shift keying modulation with a same bandwidth as the frame header is used for the data domain of the transmission frame.

For example, $\pi/2$-BPSK modulation with a bandwidth of 4 MHz is used for the frame header of the transmission frame, and 8-phase shift keying (8PSK) modulation with a bandwidth of 4 MHz is used for the data domain. A bit rate of the data domain may reach 12 Mbps, so that a throughput is greatly improved. In addition, because the phase shift keying modulation with the same bandwidth is used for both the frame header and the data domain of the transmission frame, switching between modulation schemes of the frame header and the data domain does not require addition of a guard time and a synchronization code field. Therefore, the transmission time of the frame header of the transmission frame is shortened and the latency is reduced.

Preferably, any one of $\pi/2$-BPSK, $\pi/4$-QPSK, and 8PSK may be used for the data domain.

In an embodiment, phase shift keying modulation is used for the frame header of the transmission frame, and quadrature amplitude modulation (QAM) with a same bandwidth as the frame header is used for the data domain.

For example, $\pi/2$-BPSK modulation with a bandwidth of 4 MHz is used for the frame header of the transmission frame; and 16-QAM modulation with a bandwidth of 4 MHz is used for the data domain. A bit rate of the data domain may reach 16 Mbps, so that a throughput is improved.

The PSK modulation is used for the frame header of the transmission frame, and the QAM modulation is used for the data domain of the transmission frame. Because the PSK modulation and the QAM modulation may be implemented by using a same filter, switching between modulation schemes of the frame header and the data domain of the transmission frame does not require addition of the guard time and the synchronization code 2 field to the enhanced rate frame shown in FIG. 5b. Therefore, the length of the frame header is reduced, the transmission time of the frame header of the transmission frame is shortened, and the latency is reduced.

In an embodiment, the sending apparatus negotiates with the receiving apparatus for adjustment of the modulation scheme of the frame header based on channel quality. For example, if the channel quality is good, a high-order modulation scheme, for example, $\pi/4$-QPSK, is used; or if the channel quality is poor, a low-order modulation scheme, for example, $\pi/2$-BPSK, is used. That is, different phase shift keying modulation schemes may be selected based on the channel quality.

In an embodiment, the sending apparatus may independently adjust the modulation scheme of the data domain based on the channel quality. That is, the sending apparatus may select different phase shift keying modulation schemes or quadrature amplitude modulation schemes based on the channel quality. For example, if the modulation scheme of the data domain is $\pi/2$-BPSK, and the channel quality becomes better, the sending apparatus may switch the modulation scheme of the data domain to 16-QAM or $\pi/4$-QPSK; or if the modulation scheme of the data domain is 64-QAM, and the channel quality becomes poor, the sending apparatus may switch the modulation scheme of the data domain to 16-QAM or $\pi/4$-QPSK. That is, the sending apparatus may switch the modulation scheme of the data domain between a plurality of phase shift keying modulation schemes and a plurality of quadrature amplitude modulation schemes based on the channel quality.

In an embodiment, bandwidths supported by both the frame header and the data domain of the transmission frame provided in this application include 1 MHz, 2 MHz, and 4 MHz. In addition, the frame header and the data domain of the transmission frame use a same bandwidth, so that guard time and secondary synchronization time caused by bandwidth switching are omitted, and the latency is reduced.

In an embodiment, the sending apparatus may negotiate with the receiving apparatus for bandwidth adjustment based on the channel quality, for example, if the channel quality is good, negotiate for a bandwidth increase; or if the channel quality is poor, negotiate for bandwidth reduction.

In an embodiment, the preamble is used for gain adjustment. If an amplitude of a sequence of the preamble fluctuates greatly, accuracy of the gain adjustment is affected. A signal obtained through the PSK modulation is a non-constant envelope, and an amplitude fluctuation of a signal is much larger than that of the GFSK modulation. To reduce impact of the amplitude fluctuation caused by the PSK modulation on the gain adjustment, for the sequence of the preamble in this application, any adjacent symbols are designed to be adjacent constellation points on a constellation diagram, to ensure that the amplitude fluctuation of the preamble is small when a symbol of the preamble changes, to approximate a constant envelope signal. For example, a corresponding constellation diagram is determined based on a modulation scheme (for example, $\pi/2$-BPSK modulation and $\pi/4$-QPSK modulation) of the preamble, so that any adjacent symbols of the sequence of the preamble are adjacent points on the constellation diagram corresponding to the modulation scheme.

FIG. 8 is constellation diagrams of two types of preambles according to this application. (a) in FIG. 8 shows that $\pi/4$-QPSK modulation of an all-0 sequence is used for the preamble, and constellation points on the constellation diagram corresponding to the sequence are 0, $\pi/4$, 0, $\pi/4$, . . . . For example, transformation between two adjacent symbols of the sequence of the preamble corresponds to jumping between two adjacent constellation points 0 and $\pi/4$ on the constellation diagram. (b) in FIG. 8 shows that differential quadrature phase shift keying (DQPSK) modulation of an all-0 sequence is used for the preamble, and constellation points on the constellation diagram corresponding to the sequence are $\pi/4$, $\pi/2$, $3\pi/4$, . . . , $3\pi/2$, $7\pi/4$, and 0. For example, transformation between adjacent symbols of the sequence of the preamble corresponds to movement between adjacent constellation points on the constellation diagram.

In an embodiment, PSK modulation used for a frame header or a data domain of a transmission frame has a feature of parity rotation. The parity rotation is as follows:

For a symbol sequence, a constellation diagram used by a symbol at an even position is obtained by rotating, by an angle, a constellation diagram used by a symbol at an odd position. Correspondingly, the constellation diagram used by the symbol at the odd position is obtained by rotating, by an angle, the constellation diagram used by the symbol at the even position. For example, π/2-BPSK modulation is used for the frame header or the data domain of the transmission frame, and the constellation diagram corresponding to the symbol at the odd position may be obtained by rotating the constellation diagram corresponding to the symbol at the even position by π/2 around a coordinate center of the constellation diagram. The constellation diagram with this feature can reduce a peak-to-average power ratio of a sending apparatus and increase transmit power, to cover a larger receiving range.

In an embodiment, forward error correction (FEC) coding may be used for any one of an access code, a packet header, and the data domain of the transmission frame, and a bit error rate of the transmission frame received by a receiving apparatus is reduced through the forward error correction coding.

In an embodiment, the forward error correction coding may use a convolutional code or a polar code.

In an embodiment, the sending apparatus and the receiving apparatus may perform communication to determine whether the forward error correction coding is used for the access code and the packet header of the transmission frame, that is, adjust a coding scheme of the access code and the packet header, where the coding scheme includes a coding type and a bit rate. For example, if channel quality is good, the sending apparatus and the receiving apparatus may perform communication and then choose not to encode the access code or the packet header, to achieve a high throughput and a low latency; or if channel quality is poor, the sending apparatus and the receiving apparatus may perform communication and then choose to encode the access code and the packet header. Further, a coding bit rate may also be selected based on the channel quality. If the channel quality is good, the coding bit rate may be increased to reduce redundancy, to increase the throughput and reduce the latency; or if the channel quality is poor, the coding bit rate may be reduced to increase redundancy, to improve transmission accuracy of the transmission frame and improve receiving performance.

In an embodiment, the sending apparatus may adjust a coding scheme of the data domain based on the channel quality. For example, when detecting that the channel quality is good, the sending apparatus may choose not to perform encoding, to achieve the high throughput and the low latency. For example, when detecting that the channel quality is poor, to improve transmission accuracy of the data domain field, the sending apparatus chooses to use the forward error correction coding for the data domain, and may increase or reduce the coding bit rate based on actual channel quality. Coding-related information is placed in the packet header field. The receiving apparatus performs identification based on information in the packet header, to determine whether the data domain is encoded and determine a corresponding bit rate.

It may be understood that, in the foregoing embodiment, a to-be-encoded field may be selected based on an actual application scenario, where the to-be-encoded field may be at least one of the access code, the packet header, and the data domain. For example, different coding schemes may be selected in different application environments. For example, when a requirement for data accuracy is high, the access code, the packet header, and the data domain may all be encoded; or when a requirement for a data rate is high, only the packet header may be encoded.

In an embodiment, a pilot field with a known phase may be inserted into some fields, to improve phase detection and tracking performance. In this way, when receiving a pilot, the receiving apparatus may compare a phase of the received pilot with the known pilot phase, so that a current phase shift is estimated.

In this embodiment, the fields into which the pilot may be inserted are the access code, the packet header, and the data domain. The sending apparatus may select, based on an application requirement, a field into which the pilot field is to be inserted. For example, the pilot field is inserted into all of the three fields, namely, the access code, the packet header, and the data domain, or the pilot field is inserted into any one or two of the three fields, namely, the access code, the packet header, and the data domain.

Further, the sending apparatus may select different insertion proportions to insert the pilot field into different fields based on factors such as current communication quality, a coding status, and a degree of impact of a phase shift on receiving of different fields. For example, when the channel quality is good, the sending apparatus may choose not to insert the pilot; or when the channel quality is poor, the sending apparatus chooses to insert the pilot. Better channel quality indicates a lower pilot insertion proportion. Whether the pilot is inserted into the access code and the packet header and the pilot insertion proportion are confirmed by the sending apparatus and the receiving apparatus and then adjusted. Whether the pilot is inserted into the data domain and the pilot insertion proportion are determined by the sending apparatus based on the channel quality. The receiving apparatus performs identification based on the information in the packet header, to determine whether the pilot is inserted into the data domain field and determine the insertion proportion.

For example, the sending apparatus may insert the pilot into the access code and the packet header based on an insertion proportion of 16:1, and insert the pilot into a payload based on a proportion of 8:1. For example, one pilot is inserted after every 16 access codes and 16 packet header symbols, and one pilot is inserted after every eight payload symbols. When the communication quality becomes poor, the insertion proportion may be reduced, to increase a quantity of inserted pilots and improve a phase estimation capability.

It may be understood that one or more related parameters in the foregoing embodiments, such as the modulation scheme of the transmission frame, the bandwidth, whether to encode, the coding bit rate, whether to insert the pilot, and the insertion proportion, may be adjusted based on an actual application scenario.

Figure 9:
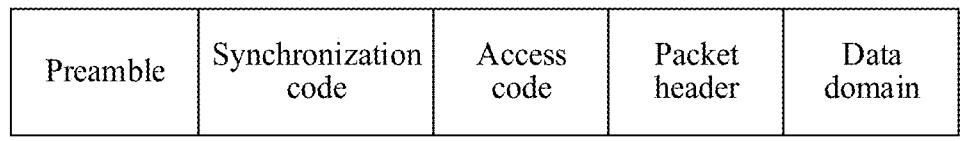
FIG. 9 is a schematic diagram of a transmission frame according to Embodiment 2 of this application.

FIG. 9 is a schematic diagram of Embodiment 2 of a transmission frame according to this application.

The transmission frame provided in Embodiment 2 is similar to the transmission frame provided in Embodiment 1, and the transmission frame includes a preamble, a synchronization access sequence, a packet header, and a data domain. Similarities are not described in detail herein again. A difference lies in:

A synchronization code and an access code are combined to form the synchronization access sequence. The synchronization code and the access code are sequentially set along a direction from the preamble to the data domain. Synchronization performance is implemented by using the synchronization code field, for example, time synchronization, frequency estimation, and phase estimation may be implemented by using the synchronization code, to improve overall performance of a receiving apparatus, ensure that information can be correctly received even when channel quality is poor, and improve receiving performance at a high rate. It may be understood that an order of setting the synchronization code and the access code may be adjusted based on an actual scenario. For example, the access code and the synchronization code are sequentially included.

In an embodiment, the synchronization code may use an m sequence or a golden sequence.

Figure 10:
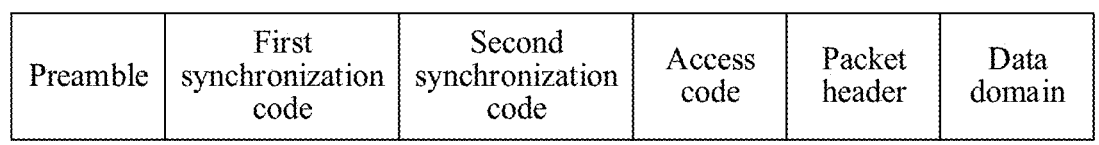
FIG. 10 is a schematic diagram of a transmission frame according to Embodiment 3 of this application.

FIG. 10 is a schematic diagram of Embodiment 3 of a transmission frame according to this application.

The transmission frame provided in Embodiment 3 is similar to the transmission frame provided in Embodiment 2, and the transmission frame includes a preamble, a synchronization access sequence, a packet header, and a data domain. Similarities are not described in detail herein again. A difference lies in:

The synchronization access sequence includes a first synchronization code, a second synchronization code, and an access code. The first synchronization code, the second synchronization code, and the access code are sequentially set along a direction from the preamble to the data domain. Two segments of synchronization codes are set to improve receiving performance and increase a quantity of combinations of synchronization codes. Combinations of different synchronization codes may be used as network IDs to distinguish devices (for example, a sending apparatus or a receiving apparatus) in different networks. Devices in a same network are distinguished by the access code. Both the first synchronization code and the second synchronization code may independently improve synchronization performance. The first synchronization code and the second synchronization code may alternatively be used to further improve synchronization performance as a whole, to improve overall performance of the receiving apparatus and ensure that information can be correctly received even when channel quality is poor. It may be understood that in another embodiment, an order of setting the first synchronization code, the second synchronization code, and the access code may be adjusted based on an actual scenario.

Further, sequences of the two synchronization codes may be same or different.

Figure 11:
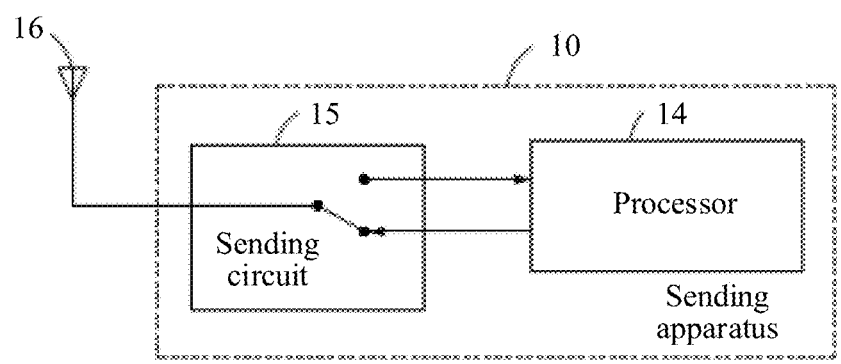
FIG. 11 is a schematic diagram of an entity structure of a sending apparatus according to an embodiment of this application.

FIG. 11 is a schematic diagram of a sending apparatus 10 according to an embodiment of this application. The sending apparatus 10 may be a terminal having a short-range wireless communication function, for example, a mobile phone or a tablet computer. Certainly, the sending apparatus 10 may alternatively be a chip having the short-range wireless communication function.

The sending apparatus 10 includes a processor 14 and a sending circuit 15. A person skilled in the art may understand that a structure shown in FIG. 11 does not constitute a limitation on the sending apparatus 10. The sending apparatus 10 may include more or fewer components than those shown in the figure, or combine some components, or split some components, or have different component arrangements. For example, the sending apparatus 10 may further include a memory.

The memory may be configured to store a software program and/or a module/unit. The processor 14 implements various functions of the sending apparatus 10 by running or executing the software program and/or the module/unit stored in the memory, and invoking data stored in the memory. In this application, the processor 14 is configured to generate a transmission frame. The memory may mainly include a program storage area and a data storage area. The program storage area may store an operating system, an application program required by at least one function, and the like. The data storage area may store data created based on use of the sending apparatus 10 and the like. In addition, the memory may include a non-volatile computer-readable memory, for example, a hard disk, a memory, a plug-in hard disk, a smart media card (SMC), a secure digital (SD) card, a flash card, at least one magnetic disk storage device, a flash memory, or another non-volatile solid-state storage device.

The processor 14 may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, and the like. The processor 14 may be a microprocessor, or the processor 14 may be any conventional processor, or the like, for example, a baseband signal processing chip. The processor 14 is a control center of the sending apparatus 10, and is connected to various parts of the entire sending apparatus 10 by using various interfaces and lines.

The sending circuit 15 is coupled to the processor 14, and is configured to send the transmission frame. The sending circuit 15 may be coupled to an antenna 16 to transmit a transmission frame signal. The sending apparatus 10 communicates with a receiving apparatus 20 by using the sending circuit 15.

Figure 12:
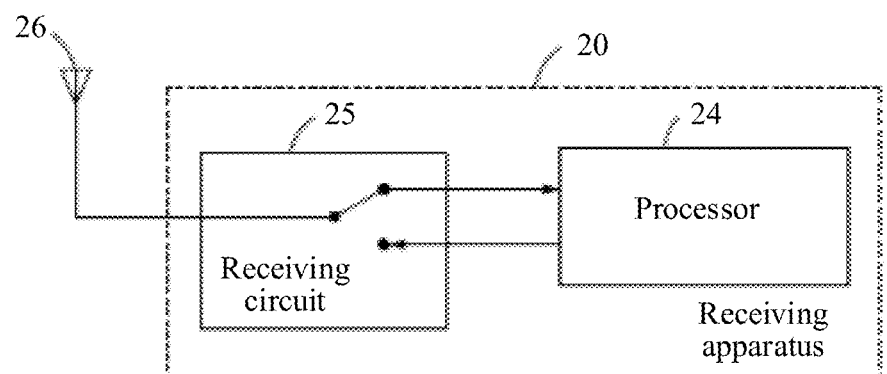
FIG. 12 is a schematic diagram of an entity structure of a receiving apparatus according to an embodiment of this application.

FIG. 12 is a schematic diagram of a receiving apparatus 20 according to an embodiment of this application. The receiving apparatus 20 may be a terminal having a short-range wireless communication function, for example, a mobile phone or a tablet computer. Certainly, the receiving apparatus 20 may alternatively be a chip having the short-range wireless communication function. The receiving apparatus 20 includes a processor 24 and a receiving circuit 25. A person skilled in the art may understand that a structure shown in FIG. 12 does not constitute a limitation on the receiving apparatus 20. The receiving apparatus 20 may include more or fewer components than those shown in the figure, or combine some components, or split some components, or have different component arrangements. For example, the receiving apparatus 20 may further include a memory.

The memory may be configured to store a software program and/or a module/unit. The processor 24 implements various functions of the receiving apparatus 20 by running or executing the software program and/or the module/unit stored in the memory, and invoking data stored in the memory. The memory may mainly include a program storage area and a data storage area. The program storage area may store an operating system, an application program required by at least one function, and the like. The data storage area may store data created based on use of the receiving apparatus 20 and the like. In addition, the memory may include a non-volatile computer-readable memory, for example, a hard disk, a memory, a plug-in hard disk, a smart media card (SMC), a secure digital (SD) card, a flash card, at least one magnetic disk storage device, a flash memory, or another non-volatile solid-state storage device.

The processor 24 may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, and the like. The processor 24 may be a microprocessor, or the processor 24 may be any conventional processor, or the like. The processor 24 is a control center of the receiving apparatus 20, and is connected to various parts of the entire receiving apparatus 20 by using various interfaces and lines.

The receiving circuit 25 is coupled to the processor 24 and configured to receive a transmission frame. The receiving circuit 25 may be coupled to an antenna 26 to receive a transmission frame signal. The receiving apparatus 20 communicates with a sending apparatus 10 by using the receiving circuit 25.

Figure 13:
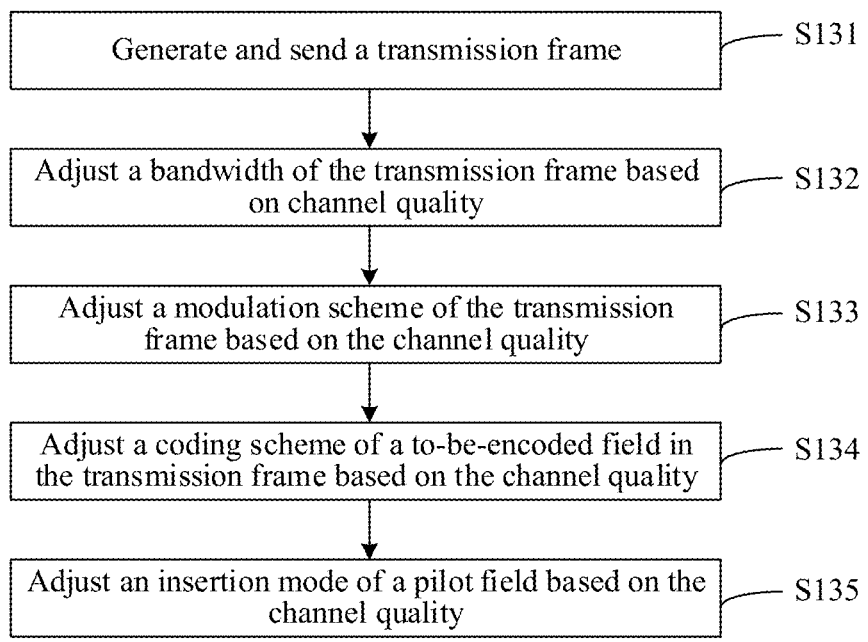
FIG. 13 is a flowchart of a short-range wireless communication method according to an embodiment of this application.

FIG. 13 is a flowchart of a short-range wireless communication method according to an embodiment of this application. The method is performed by a sending apparatus. Based on different requirements, an order of operations in the flowchart may be changed, and some operations may be omitted. For ease of description, only a part related to this embodiment of this application is shown. The short-range wireless communication method includes:

S131. Generate and send a transmission frame.

In an embodiment, the transmission frame includes a preamble, a synchronization access sequence, a packet header, and a data domain. The synchronization access sequence is used to perform frame synchronization, and phase shift keying modulation with a same bandwidth is used for all of the preamble, the synchronization access sequence, the packet header, and the data domain; or quadrature amplitude modulation is used for the data domain, and phase shift keying modulation with a same bandwidth as the data domain is used for all of the preamble, the synchronization access sequence, and the packet header. The bandwidth is determined by the sending apparatus and a receiving apparatus through negotiation.

In this way, the phase shift keying modulation is used for a frame header of the transmission frame, and the phase shift keying modulation or the quadrature amplitude modulation with the same bandwidth is used for the data domain, to improve a transmission rate of the transmission frame. A format of the transmission frame is simple, a length of the frame header is short, and transmission time is minimized, to achieve a high throughput and a low latency.

It may be understood that generating the transmission frame and sending the transmission frame may be performed by different modules of the sending apparatus.

In addition, for the format and another feature of the transmission frame, refer to the foregoing embodiments, and details are not described herein again.

In an embodiment, refer to FIG. 13. The short-range wireless communication method further includes:

S132. Adjust a bandwidth of the transmission frame based on channel quality.

Bandwidths supported by the transmission frame include: 1 MHz, 2 MHz, and 4 MHz. Bandwidths of the frame header and the data domain of the transmission frame are the same.

In an embodiment, refer to FIG. 13 again. The short-range wireless communication method further includes:

S133. Adjust a modulation scheme of the transmission frame based on the channel quality.

A modulation scheme of at least one of the frame header and the data domain is to be adjusted. The sending apparatus negotiates with the receiving apparatus for adjustment of the modulation scheme of the frame header based on the channel quality. The sending apparatus may switch the modulation scheme of the data domain between a plurality of phase shift keying modulation schemes and a plurality of quadrature amplitude modulation schemes based on the channel quality.

In an embodiment, refer to FIG. 13 again. The short-range wireless communication method further includes:

S134. Adjust a coding scheme of a to-be-encoded field in the transmission frame based on the channel quality.

The to-be-encoded field includes at least one of an access code, the packet header, and the data domain, the coding scheme includes a coding type and a bit rate, and the coding type may be forward error correction coding.

In an embodiment, the sending apparatus may select an appropriate coding type, for example, a convolutional code or a polar code, based on a channel instruction. The sending apparatus may adjust a coding bit rate based on the channel quality. For example, if the channel quality is good, the coding bit rate may be increased, or even the transmission frame may not be encoded, to achieve a high throughput and a low latency; or if the channel quality is poor, the coding bit rate may be reduced to increase redundancy, to improve transmission accuracy of the transmission frame and improve receiving performance.

In an embodiment, refer to FIG. 13. The short-range wireless communication method further includes:

S135. Adjust an insertion mode of a pilot field based on the channel quality.

The insertion mode includes a to-be-inserted field and an insertion proportion.

In an embodiment, the to-be-inserted field includes the access code, the packet header, and the data domain. The sending apparatus may select, based on an application requirement environment, a field into which the pilot field is to be inserted. For example, the pilot is inserted into any one or more of the three fields, namely, the access code, the packet header, and the data domain.

Further, the sending apparatus may select different proportions to insert the pilot field into different fields based on factors such as current communication quality, coding information, and a degree of impact of a phase shift on receiving of different fields.

In a flowchart of a short-range wireless communication method according to another embodiment of this application, the method is performed by a receiving apparatus. Based on different requirements, an order of operations in the flowchart may be changed, and some operations may be omitted. For ease of description, only a part related to this embodiment of this application is shown. The short-range wireless communication method includes: receiving a transmission frame, where the transmission frame includes at least a preamble, a synchronization access sequence, a packet header, and a data domain, the synchronization access sequence is used to perform frame synchronization, and phase shift keying modulation with a same bandwidth is used for all of the preamble, the synchronization access sequence, the packet header, and the data domain; or quadrature amplitude modulation is used for the data domain, and phase shift keying modulation with a same bandwidth as the data domain is used for all of the preamble, the synchronization access sequence, and the packet header.

In addition to the foregoing method and device, an embodiment of this application further provides a computer-readable storage medium. The computer-readable storage medium stores a program, and the program enables a computer device to perform the short-range wireless communication method shown in FIG. 13.

A computer program product is provided. The computer program product includes computer-executable instructions, and the computer-executable instructions are stored in a computer-readable storage medium. At least one processor of a device may read the computer-executable instructions from the computer-readable storage medium, and the at least one processor executes the computer-executable instructions, to enable the device to implement the short-range wireless communication method shown in FIG. 13.

Based on the descriptions of the foregoing implementations, a person skilled in the art may clearly understand that this application may be implemented by software in addition to universal hardware, or certainly may be implemented by dedicated hardware, including a dedicated integrated circuit, a dedicated CPU, a dedicated memory, a dedicated component, and the like. Generally, any function that can be performed by a computer program can be easily implemented by using corresponding hardware. Moreover, a specific hardware structure used to achieve a same function may be in various forms, for example, in a form of an analog circuit, a digital circuit, or a dedicated circuit. However, in this application, software program implementation is a preferred implementation in more cases. Based on such an understanding, the technical solutions of this application essentially or the part contributing to the conventional technology may be implemented in a form of a software product. The computer software product is stored in a readable storage medium, for example, a floppy disk, a USB flash drive, a removable hard disk, a ROM, a RAM, a magnetic disk, or an optical disc of a computer, and includes several instructions for instructing a computer device (which may be a personal computer, a server, a network device, or the like) to perform the methods described in embodiments of this application.

All or a part of the foregoing embodiments may be implemented by software, hardware, firmware, or any combination thereof. When software is used to implement the embodiments, all or a part of the embodiments may be implemented in a form of a computer program product.

The computer program product includes one or more computer instructions. When the computer program instructions are loaded and executed on a computer, the procedures or functions according to embodiments of this application are all or partially generated. The computer may be a general-purpose computer, a dedicated computer, a computer network, or any other programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

Finally, it should be noted that the foregoing embodiments are merely used to describe technical solutions of this application but are not intended to limit the technical solutions. Although this application is described in detail with reference to the example embodiments, a person of ordinary skill in the art should understand that the technical solutions of this application may be modified or equivalently replaced without departing from the spirit and scope of the technical solutions of this application.

What is claimed is:

1. An apparatus comprising:
a memory configured to store a computer program, and
a processor configured to execute the computer program stored in the memory, to cause the apparatus to perform operations, the operations comprising:
generating a transmission frame, wherein the transmission frame comprises a frame header and a data domain, phase shift keying modulation is used for the frame header, and phase shift keying modulation or quadrature amplitude modulation with a same bandwidth as the frame header is used for the data domain; and
sending the transmission frame, wherein the frame header comprises a preamble, first phase shift keying modulation is used for the preamble, and any adjacent symbols of a sequence of the preamble are adjacent points on a constellation diagram corresponding to the first phase shift keying modulation.

2. The apparatus according to claim 1, wherein the frame header further comprises an access code.

3. The apparatus according to claim 1, wherein the frame header further comprises a synchronization code and an access code.

4. The apparatus according to claim 1, wherein the frame header further comprises a first synchronization code, a second synchronization code, and an access code.

5. The apparatus according to claim 1, wherein the operations further comprise:
determining a modulation scheme of the transmission frame based on channel quality.

6. The apparatus according to claim 1, wherein the operations further comprise:
determining a bandwidth of the transmission frame based on channel quality, wherein bandwidths supported by the transmission frame comprise: 1 MHZ, 2 MHZ, and 4 MHz.

7. The apparatus according to claim 1, wherein the phase shift keying modulation has a feature of parity rotation.

8. The apparatus according to claim 2, wherein the frame header further comprises a packet header, and the operations further comprise:
determining a coding scheme of a to-be-encoded field in the transmission frame based on channel quality, wherein the to-be-encoded field comprises at least one of the access code, the packet header, and the data domain, the coding scheme comprises a coding type and a bit rate, or the coding type is forward error correction coding.

9. The apparatus according to claim 2, wherein the frame header further comprises a packet header, and the operations further comprise:
determining an insertion mode of a pilot field, wherein the insertion mode comprises a to-be-inserted field and an insertion proportion, the to-be-inserted field comprises at least one of the access code, the packet header, or the data domain.

10. An apparatus comprising:
a memory configured to store a computer program, and
a processor configured to execute the computer program stored in the memory, to cause the apparatus to perform operations, the operations comprising:
receiving a transmission frame, wherein the transmission frame comprises a frame header and a data domain, phase shift keying modulation is used for the frame header, and phase shift keying modulation or quadrature amplitude modulation with a same bandwidth as the frame header is used for the data domain, wherein the frame header comprises a preamble, first phase shift keying modulation is used for the preamble, and any adjacent symbols of a sequence of the preamble are adjacent points on a constellation diagram corresponding to the first phase shift keying modulation.

11. The apparatus according to claim 10, wherein the frame header further comprises an access code.

12. The apparatus according to claim 10, wherein the frame header further comprises a synchronization code and an access code.

13. The apparatus according to claim 10, wherein the frame header further comprises a first synchronization code, a second synchronization code, and an access code.

14. The apparatus according to claim 10, wherein bandwidths supported by the transmission frame comprise: 1 MHZ, 2 MHZ, and 4 MHz.

15. The apparatus according to claim 10, wherein the phase shift keying modulation has a feature of parity rotation.

16. The apparatus according to claim 11, wherein the frame header further comprises a packet header, and forward error correction coding is used for at least one of the access code, the packet header, or the data domain.

17. The apparatus according to claim 11, wherein the frame header further comprises a packet header, at least one of the access code, or packet header, and the data domain has a pilot field, and the pilot field is used to assist in phase estimation.

18. A short-range wireless communication system, comprising:
a sending apparatus configured to:
generate a transmission frame, wherein the transmission frame comprises a frame header and a data domain, phase shift keying modulation is used for the frame header, and phase shift keying modulation or quadrature amplitude modulation with a same bandwidth as the frame header used for the data domain, and
send the transmission frame; and
a receiving apparatus configured to receive the transmission frame, wherein the frame header comprises a preamble, first phase shift keying modulation is used for the preamble, and any adjacent symbols of a sequence of the preamble are adjacent points on a constellation diagram corresponding to the first phase shift keying modulation.

\* \* \* \* \*